Patented Mar. 25, 1930

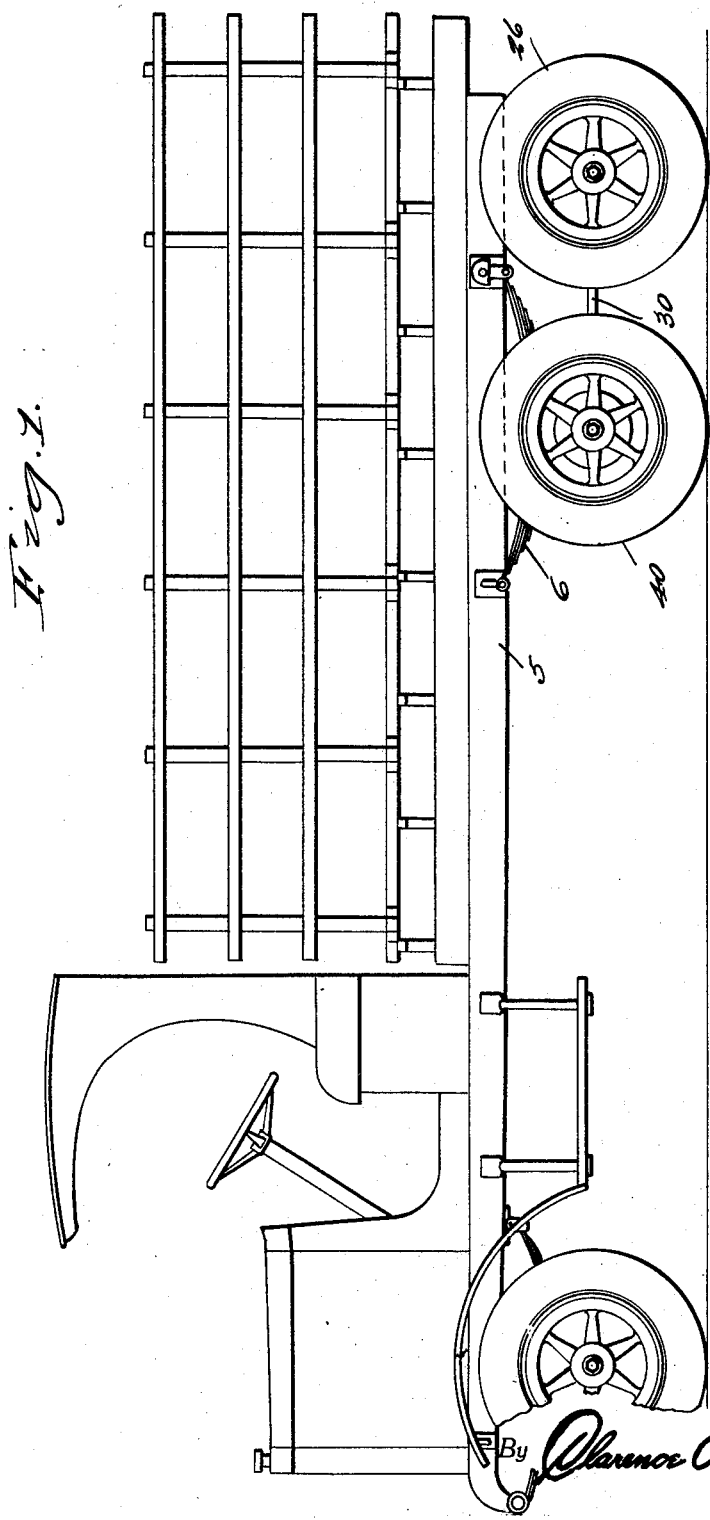

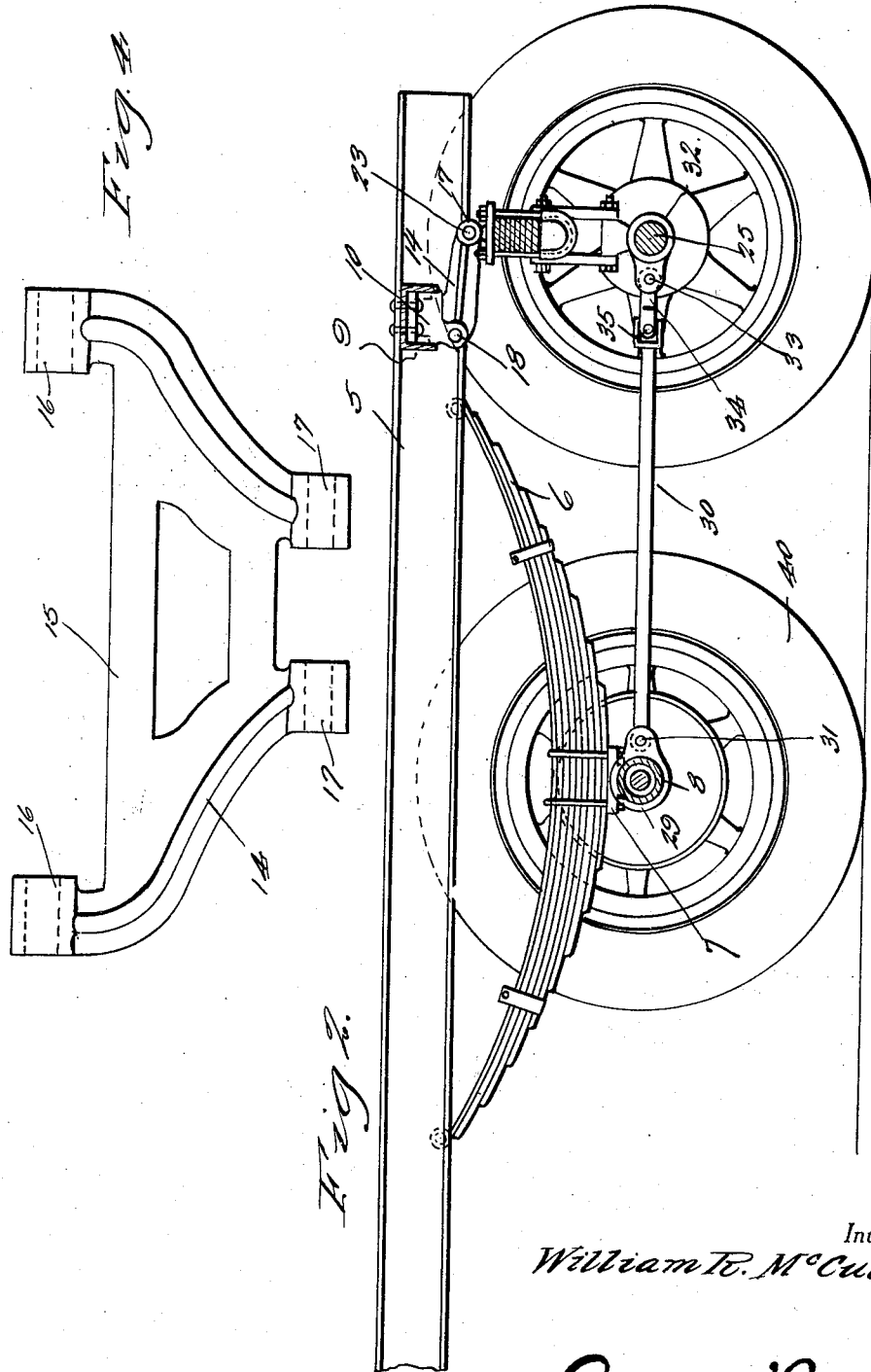

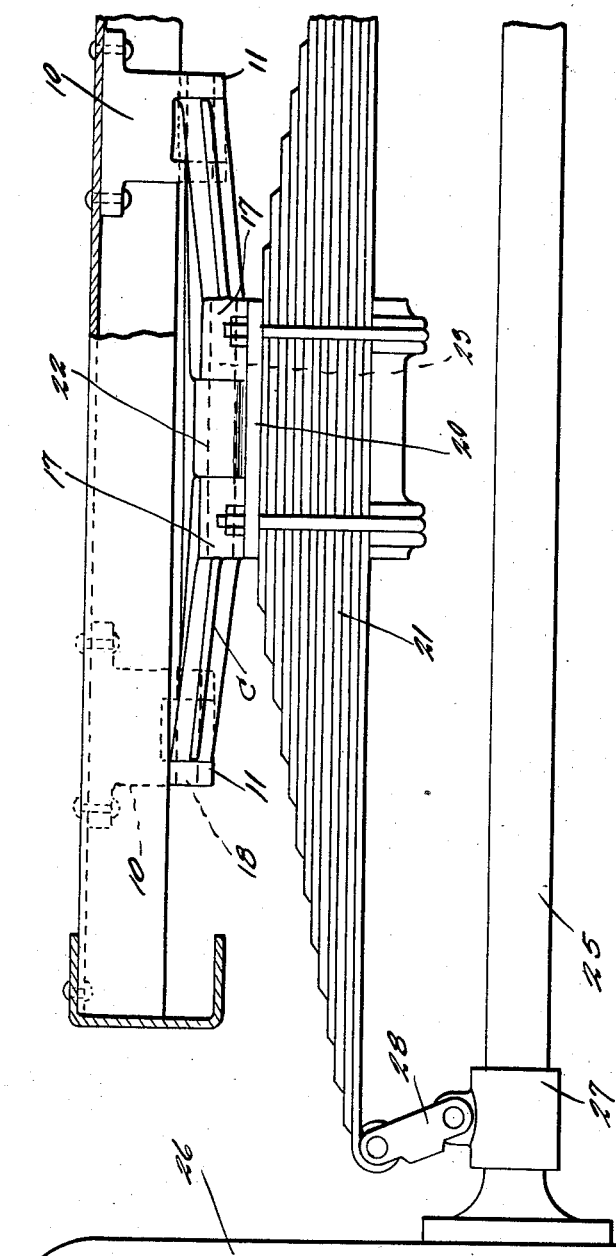

1,751,871

UNITED STATES PATENT OFFICE

WILLIAM R. McCULLA, OF SIDNEY, OHIO, ASSIGNOR TO PLUS-TWO WHEELS, INC., OF SIDNEY, OHIO, A CORPORATION OF OHIO

WHEELED ATTACHMENT FOR MOTOR TRUCKS

Application filed February 20, 1929. Serial No. 341,462.

The present invention relates to a wheeled attachment for motor trucks having for its prime object to provide an attachment whereby the ordinary four wheel motor truck may be transformed into an efficient and reliable six wheel truck to gain the advantages of increased riding comfort due to a more balanced load, increased safety by reducing skidding to a minimum, increased economy and cost of operation, reduced unsprung weight, reduced impact forces thereby prolonging the life of the vehicle, reduced loads on each wheel thereby prolonging the life of wheel tires and greatly saving highways and road beds.

Another very important object of the invention resides in the provision of an attachment of this nature which is simple in its construction, easy to attach to the truck, strong and durable, inexpensive to manufacture, and otherwise well adapted to the purpose for which it is designed.

In the drawing:

Figure 1 is a side elevation of a truck embodying the features of my invention,

Figure 2 is a longitudinal section through the rear portion thereof to illustrate the mounting of the attachment, Figure 3 is a transverse section therethrough, and Figure 4 is a detail view of the arm casting.

Referring to the drawing in detail it will be seen that numeral 5 denotes an automobile truck chassis or frame mounted in the usual well known manner on semi-elliptical rear springs 6 which are attached by means of spring seats 7 on rear axle housing 8.

The features thus far described are conventional and illustrated for the purpose of bringing out clearly the utility of my attachment.

A channel bar 9 is fixed across the rear portion of the frame 5 to the rear of springs 6 and has mounted one to each side of the center, a pair of bearing blocks 10. Each bearing block 10 has a pair of spaced bearings 11. A casting C forms an arm which includes a pair of side members 14 which diverge forwardly from each other and are connected by a web 15.

The front ends of the members 14 terminate in bearings 16 while the rear ends terminate in bearings 17.

The bearings 16 are located between the bearings 11 of the block 10 and pivot pins 18 extend through bearings 11 and 16.

A spring seat 20 is mounted on a transverse spring 21 and includes a single bearing 22 disposed between bearings 17 and pivotally engaged therewith by means of a pin 23. The numeral 25 denotes an auxiliary axle having wheels 26 on the ends thereof. Collars 27 are mounted adjacent the ends of the axle and spring shackles 28 connect the collars 25 with the ends of the transverse spring 21.

A collar 29 is mounted on the axle housing 8 and has a rod 30 pivotally connected therewith as at 31. A collar 32 is mounted on the auxiliary axle 25 and has pivoted thereto as at 33 a rod 34 and the rods 30 and 34 are connected together by universal joint 35. The rod 34 is much shorter than the rod 30 as is clearly illustrated in Figure 2.

This auxiliary or extension axle is placed so as to distribute the pay load sixty per cent on the drive axle and forty per cent on the extension axle. The load pressure at support of extension is taken by the arm casting C against blocks 10.

In turn this pressure is reverted through the spring 21 and on the axle 25. The alinement rods 30 and 34, preferably two in number one to each side, keep the extension wheels 26 tracking with the drive wheels 40 and the universal joint provides the necessary flexibility on the turn, eliminating undue wear on the tire.

By placing the spring 21 at right angles to the springs 6 there is provided an equalizing effect upon the load, thus keeping the chassis in a level position at all times.

It will be seen that the design is simple and that the parts are comparatively few. Besides the wheel bearings it has but seven working parts other than those incorporated in a standard commercial vehicle. This attachment increases the weight of the vehicle only a small per cent whereas the pay load increases fifty per cent. The extension becomes a part of the chassis, greatly increasing its strength.

The wheels are constantly in positive alinement. Provision is made for tracking of the rear wheels eliminating undue tire wear in turning. Lubrication may be provided in accordance with vehicle manufacture specifications.

The load being distributed over six wheels, there is no overloading on any part. The attachment provides the necessary flexibility to adjust itself to all road irregularities.

It is thought that the construction, utility and advantages of this invention will now be quite apparent to those skilled in this art without a more detailed description thereof.

The present embodiment of the invention has been disclosed in considerable detail merely for the purposes of exemplification since in actual practice it attains the features of advantage enumerated as desirable in the statement of the invention and the above description.

It is apparent that changes in the details of construction, and in the combination and arrangement of parts may be resorted to without departing from the spirit or scope of the invention as hereinafter claimed or sacrificing any of its advantages.

Having thus described my invention, what I claim as new is:

In combination with a vehicle; wherein the vehicle comprises a chassis, a pair of rear springs attached to the chassis, a rear axle assembly on the rear springs; of an attachment including a cross member in the rear of the chassis, an arm pivotally mounted to the cross member, a spring transversely disposed to the chassis and pivotally connected at its center with the arm, an extension axle mounted on the opposite ends of the transverse spring, and wheels on the extension axle, and rods between the axle assembly and rear axle, said rods including universal joints, means for pivotally connecting the rods with the axle assembly and the extension axle, said arm including a casting formed with a pair of side members converging rearwardly toward each other, a web connecting the side members, a pair of bearings one at the rear end of each side member and a pair of bearings one at the front end of each side member, blocks in the cross member having pairs of bearings to receive the front bearings of the arm casting, pins for pivotally engaging the last mentioned bearings, a spring seat on the transverse seat having a bearing between the rear bearings of the arm casting and a pin pivoting said last mentioned bearings together.

In testimony whereof I affix my signature.

WILLIAM R. McCULLA.